United States Patent
Delfino et al.

(10) Patent No.: US 10,759,130 B2
(45) Date of Patent: Sep. 1, 2020

(54) SPOKE FABRICATION FOR A NON-PNEUMATIC WHEEL

(71) Applicants: Compagnie Generale des Etablissements Michelin, Clermont-Ferrand (FR); Michelin Recherche et Technique S.A., Granges-Paccot (CH)

(72) Inventors: Antonio Delfino, Givisiez (CH); Philippe Berguerand, Givisiez (CH); Pascal Schroeter, Givisiez (CH); Maeike Blanc, Givisiez (CH)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 79 days.

(21) Appl. No.: 15/780,382

(22) PCT Filed: Oct. 30, 2015

(86) PCT No.: PCT/IB2015/058418
§ 371 (c)(1),
(2) Date: May 31, 2018

(87) PCT Pub. No.: WO2017/072560
PCT Pub. Date: May 4, 2017

(65) Prior Publication Data
US 2018/0345610 A1 Dec. 6, 2018

(51) Int. Cl.
*B29D 30/02* (2006.01)
*B29C 70/76* (2006.01)
(Continued)

(52) U.S. Cl.
CPC ............. *B29D 30/02* (2013.01); *B29C 70/76* (2013.01); *B60B 5/02* (2013.01); *B60B 9/04* (2013.01);
(Continued)

(58) Field of Classification Search
CPC ....... B29C 70/74; B29C 70/76; B29C 70/763; B60B 7/14; B60B 9/26; B60B 2007/146; B21K 1/34; Y10T 29/49522
(Continued)

(56) References Cited

U.S. PATENT DOCUMENTS 3,057,767 A * 10/1962 Kaplan ................. B29C 70/347
156/172
4,655,682 A * 4/1987 Kunz ....................... F01D 9/042
415/119
(Continued)

FOREIGN PATENT DOCUMENTS

| EP | 1304238 A1 | 4/2003 |
|---|---|---|
| WO | WO2014/082115 A1 | 6/2014 |
| WO | WO2015/058181 A1 | 4/2015 |

OTHER PUBLICATIONS

International Search Report for PCT/IB2015/058418 dated Jun. 28, 2016.
(Continued)

*Primary Examiner* — Leith S Shafi
*Assistant Examiner* — Nicholas J Chidiac
(74) *Attorney, Agent, or Firm* — Dority & Manning, P.A.

(57) ABSTRACT

An exemplary method of manufacture for a spoke (100) of a non-pneumatic wheel. The spoke can be manufactured with a reinforcement structure having reinforcement elements and one or more layers of material. The spoke can also be provided in various shapes and configurations. The spoke includes anchors (112, 114) that allow the spoke to be more
(Continued)

readily incorporated into, or removed from, a non-pneumatic wheel. More particularly, the anchors also allow the spoke to be joined as one-piece with the non-pneumatic wheel or releasably connected on one or both ends with the non-pneumatic wheel.

14 Claims, 10 Drawing Sheets

(51) Int. Cl.
| | | |
|---|---|---|
| *B60B 5/02* | (2006.01) | |
| *B60B 31/00* | (2006.01) | |
| *B60B 9/04* | (2006.01) | |
| *B60C 7/14* | (2006.01) | |
| *B29K 75/00* | (2006.01) | |
| *B29K 83/00* | (2006.01) | |

(52) U.S. Cl.
CPC ............ *B60C 7/14* (2013.01); *B29K 2075/00* (2013.01); *B29K 2083/00* (2013.01); *B29K 2995/0077* (2013.01); *B60B 31/00* (2013.01); *B60C 2007/146* (2013.01)

(58) Field of Classification Search
USPC .................................................. 264/259, 263
See application file for complete search history.

(56) References Cited

U.S. PATENT DOCUMENTS

| | | | | |
|---|---|---|---|---|
| 5,375,978 | A * | 12/1994 | Evans | ........................ F01D 5/14 |
| | | | | 416/2 |
| 5,915,796 | A | 6/1999 | Beyer | |
| 2007/0267116 | A1 | 11/2007 | Rhyne | |
| 2008/0191543 | A1 | 8/2008 | Saillet | |
| 2010/0054937 | A1* | 3/2010 | Beckford | .................. F01D 5/14 |
| | | | | 416/2 |
| 2014/0367007 | A1 | 12/2014 | Thompson | |
| 2015/0174885 | A1* | 6/2015 | Khan | ...................... B32B 38/08 |
| | | | | 156/176 |
| 2018/0345718 | A1* | 12/2018 | Delfino | ..................... B60B 5/02 |

OTHER PUBLICATIONS

International Search Report for PCT/IB2015/058420 dated Jul. 14, 2016.

\* cited by examiner

SPOKE FABRICATION FOR A NON-PNEUMATIC WHEEL

FIELD OF THE INVENTION

The present invention relates to a method of manufacture for a non-pneumatic wheel.

BACKGROUND OF THE INVENTION

Non-pneumatic wheel constructions and their benefits are described in e.g., U.S. Pat. Nos. 6,769,465; 6,994,134; 7,013,939; and 7,201,194, which are incorporated herein by reference in their entirety. Some non-pneumatic tire constructions propose incorporating a shear band, embodiments of which are described in e.g., U.S. Pat. Nos. 6,769,465 and 7,201,194. Such non-pneumatic tires provide advantages in tire performance without relying upon a gas inflation pressure for support of the loads applied to the tire.

In one example of a non-pneumatic wheel, a compliant band with a ground contacting portion can be connected with a plurality of tension-transmitting, web-like elements (i.e. spokes) extending radially from a center element or hub. For certain constructions, such non-pneumatic wheel may be formed by open cast molding in which a material such as e.g., polyurethane is poured into a mold that forms all or part of the non-pneumatic tire. One or more inextensible reinforcement structures such as cords may be molded in place in the compliant band.

Typically, in such prior constructions, the spokes and the hub are molded as an integral, single-piece construction. Alternatively, the spokes may be integrally joined by a band that is then joined with a hub or wheel center. In either construction, the spokes are not readily removable from either the radially-outer end attached with the compliant band or the radially inner end attached to the hub or wheel center.

The construction of the spokes can affect the performance of the non-pneumatic wheel. Spokes constructed from different sizes, configurations, and materials of construction can affect the way tension is transmitted between the wheel hub and the compliant band, leading to differences in load carry capabilities of the non-pneumatic wheel and perceived handling characteristics. The density of the spokes can also determine e.g., how much tension each spoke carries as it rotates to the top of the wheel during operation.

Because of e.g., the integral construction, prior non-pneumatic wheel constructions are not readily amenable to substituting different spokes into the non-pneumatic wheel. Such a substitution would require destructive steps to cut or extricate both ends of the spoke from the wheel. Additionally, because the spokes are joined or attached with the wheel hub, the substitution of different wheels hubs of different materials or configuration is not readily feasible. Finally, prior manufacturing methods have not been conducive to incorporating reinforcements, shapes, layers of material, and other features into the construction of the spoke.

Accordingly, a spoke for a non-pneumatic wheel that can be more readily molded with reinforcements, various shapes, one or more layers of material, and other features would be useful. Such a spoke that can be readily incorporated into a non-pneumatic wheel without integral construction with the wheel hub would also be beneficial. A spoke that can be more readily connected and disconnected from the wheel hub, the compliant band, or both, would also be useful. A method of manufacturing such a wheel spoke would also be beneficial.

SUMMARY OF THE INVENTION

The present invention provides an exemplary method of manufacture for a spoke for a non-pneumatic wheel. The spoke can be manufactured with a reinforcement structure having reinforcement elements and one or more layers of material. The spoke can also be provided in various shapes and configurations. The spoke includes anchors that allow the spoke to be more readily incorporated into, or removed from, a non-pneumatic wheel. More particularly, the anchors also allow the spoke to be joined as one-piece with the non-pneumatic wheel or releasably connected on one or both ends with the non-pneumatic wheel. Additional objects and advantages of the invention will be set forth in part in the following description, or may be apparent from the description, or may be learned through practice of the invention.

In one exemplary aspect, the present invention provides a method of manufacturing a spoke for a non-pneumatic wheel. The wheel defines radial, axial, and circumferential directions. The spoke has a web-like body extending between an outer anchor at a radially-outer end of the spoke and an inner anchor at a radially-inner end of the spoke. The method includes cutting a sheet to form a precursor, the precursor having an overall shape desired for the spoke and having a radially-outer end and a radially-inner end. The sheet includes a polymeric material and a plurality of elongate, reinforcement elements extending parallel to each other.

The method also includes folding the radially-outer end to form an outer fold and folding the radially-inner end to form an inner fold; placing an outer anchor strip into a groove of a first mold portion at a location for forming the radially-outer end of the spoke; placing an inner anchor strip into another groove of the first mold portion at a location for forming the radially-inner end of the spoke; inserting the precursor into the first mold portion in contact with the inner anchor strip and the outer anchor strip; placing another outer anchor strip into a recess of a second mold portion at a location for forming the radially-outer end of the spoke; placing another inner anchor strip into another recess of the second mold portion at a location for forming the radially-inner end of the spoke; joining the first mold portion and the second mold portion so as to combine the precursor and anchor strips together; and heating the precursor and anchor strips so as to join and cross-link the precursor and anchor strips and form the spoke.

The method of manufacturing a spoke for a non-pneumatic wheel may also include pressing the outer fold and the inner fold to as to self-adhere the polymeric material of the precursor before inserting the precursor into the first mold portion. The method may also include pressing the anchor strip portions into the first and second mold portions after placing the anchor strip portions into the first and second mold portions. The method may also include applying pressure to the precursor and anchor strips during the heating. The anchor strips may be joined to form the outer anchor and the inner anchor. The sheet of polymeric material may include a plurality of layers of rubber materials. The method may include orienting the sheet so that the plurality of elongate, reinforcement elements extend longitudinally between the radially-outer end and the radially-inner end of the precursor. The reinforcement elements may include inextensible cords extending between the radially-outer end and the radially-inner end of the precursor. The sheet may include a first pair of layers comprising a first polymeric material, wherein the first pair of layers extend between the radially-outer end and the radially-inner end with the reinforcement elements embedded between the first pair of layers; and a second pair of layers comprising a second polymeric material, wherein the second pair of layers extend between the radially-outer end and the radially-inner end with the first pair of layers positioned between the second pair of layers.

The method may include placing an outer elongate rod within the outer fold, and placing an inner elongate rod within the inner fold. The inner elongate rod and the outer elongate rod may each extend along the axial direction between the opposing edges of the web-like body. The inner elongate rod and the outer elongate rod may each comprise a fiberglass material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

As used herein, the following definitions apply.

Axial direction A refers to a direction parallel to an axis about which a referenced exemplary wheel rotates during use.

Radial direction R refers to a direction perpendicular to axial direction A with radially-outer or radially outward referring to a general direction away from axial direction A, and radially-inner or radially inward referring to a general direction towards axial direction A.

Circumferential direction C refers to a direction defined by defined by the circumference of the wheel or the direction of its rotation about an axis.

Figure 1:
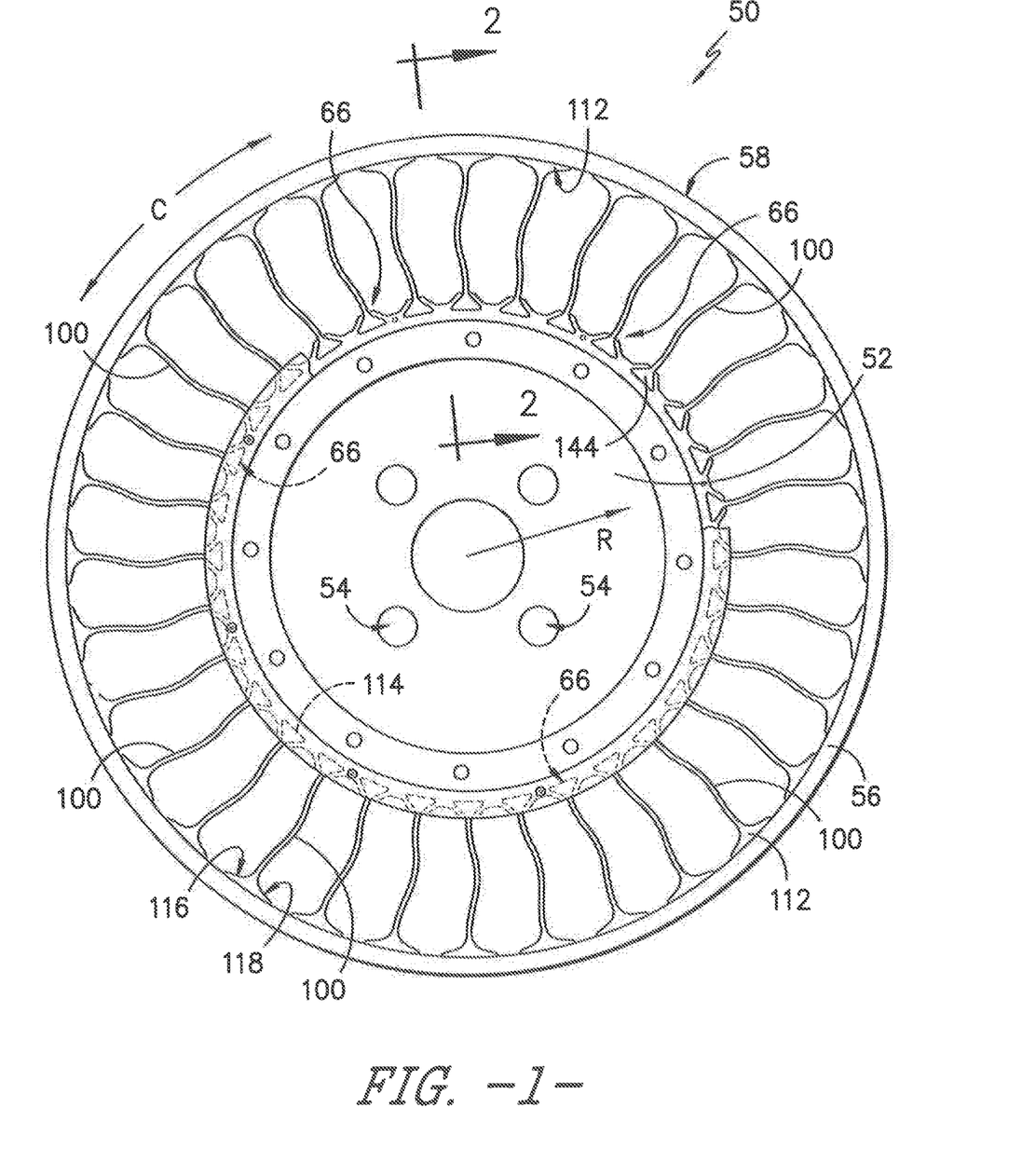
FIG. 1 illustrates a side view of an exemplary non-pneumatic wheel incorporating an exemplary embodiment of a spoke of the present invention.
Figure 2:
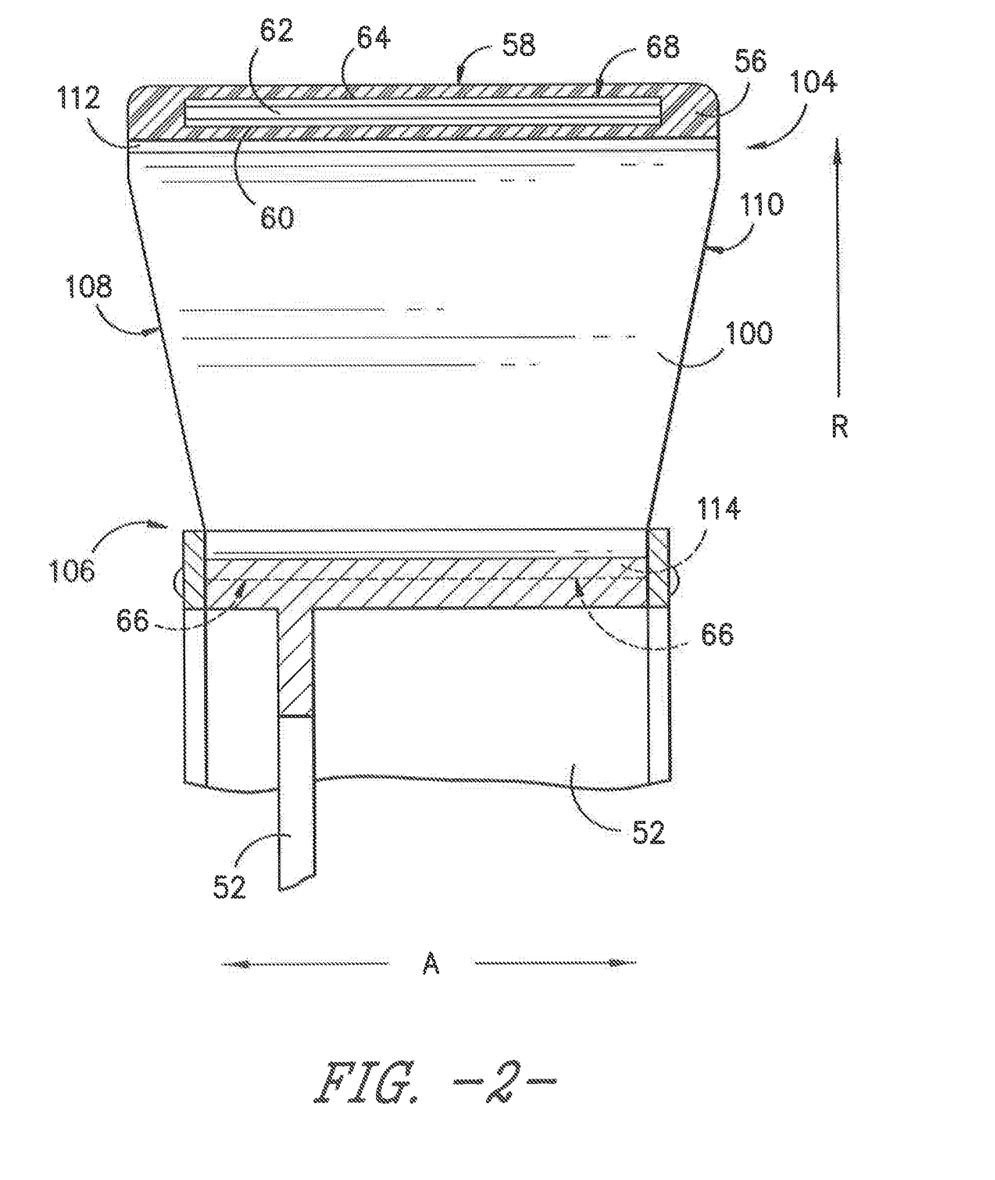
FIG. 2 provides a cross-sectional view of the exemplary non-pneumatic wheel taken along line 2-2 of FIG. 1.

FIG. 1 provides a side view of an exemplary non-pneumatic wheel 50 that can be manufactured using the present invention while FIG. 2 provides a cross-sectional view of wheel 50 taken along a meridian plane at line 2-2 in FIG. 1. The present invention is not limited to the particular shape, size, or appearance of the wheels shown in the figures. As will be understood using the teachings disclosed herein, wheels of other shapes, sizes, and appearances may be used as well.

Non-pneumatic wheel 50 includes a wheel hub 52 provided with a series of apertures 54 through which threaded lugs or other fasteners may be inserted in order to mount wheel 50 onto a vehicle. Other mounting configurations may be used as well. Non-pneumatic wheel 50 also includes a compliant, load supporting band 56 positioned radially outward of a hub 52 and positioned concentrically with hub 52. A tread 58 may be formed on, or provided as part of, load supporting band 56. For example, tread band 58 may be adhered to load supporting hand 56, embedded therein, or formed integrally as shown in FIG. 2. Other constructions may be used as well.

A plurality of tension-transmitting web elements or spokes 100 extend along the radial direction R between hub 52 and load supporting hand 56. Spokes 100 are adjacent to one another and spaced apart about circumferential direction C of wheel 50. Spokes 100 may have other shapes and configurations from what is shown in FIGS. 1 and 2. Spokes 100 may also be formed at various angles from radial direction R. Using shear band 68, load supporting band 56 supports loads transmitted to non-pneumatic wheel 50 when mounted to a vehicle using mounting disk 52. The load is transmitted by tension through spokes 100 to compliant band 56. In one exemplary embodiment, as wheel 50 rotates, spokes 100 are in tension as they reach the top of the wheel at a position away from the contact patch while spokes 100 near the contact patch may experience minimal tension and may even slightly buckle or bend.

By way of example, load supporting band 56 may be constructed to include shear band 66 having an inner reinforcing band 60, outer reinforcing band 64, and a shear layer 62 positioned therebetween. Shear layer 62 may be constructed e.g. of an elastomeric material such as e.g., natural and synthetic rubbers, polyurethanes, foamed rubbers and polyurethanes, segmented copolyesters, and block co-polymers of nylon. The reinforcing bands 60, 64 may include reinforcements constructed from e.g., essentially inextensible cord reinforcements embedded in an elastomeric coating. Such reinforcements may include e.g., any of several materials suitable for use as tire belt reinforcements in conventional tires such as cords of steel, composites of glass and resin such as e.g., fiberglass reinforced plastics, and other materials having a high modulus in tension and compression. Other constructions and materials may be used as well.

Figure 3:
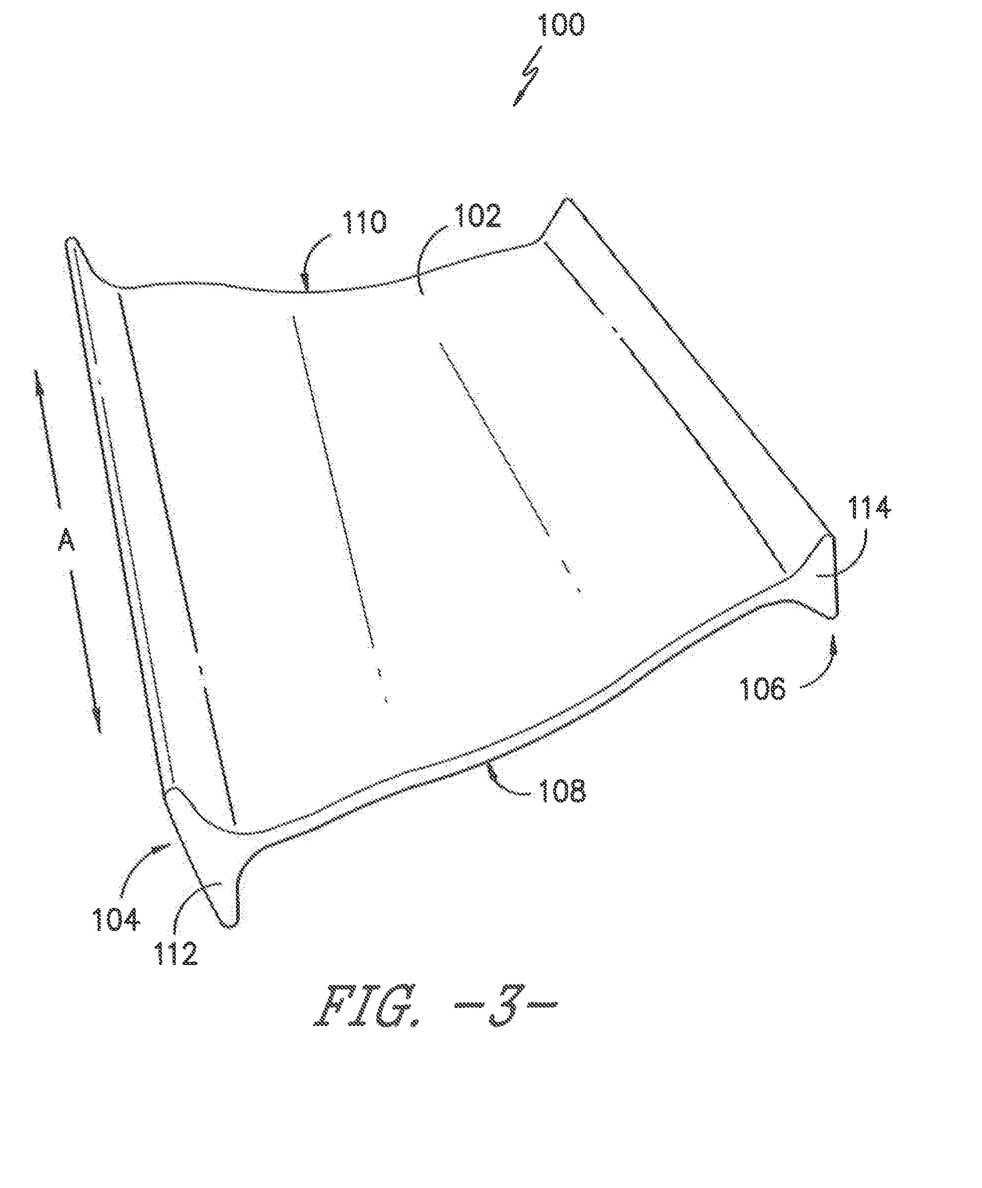
FIG. 3 illustrates a perspective view of an exemplary embodiment of a web spoke of the present invention can be used in the exemplary non-pneumatic wheel of FIG. 1.
Figure 4:
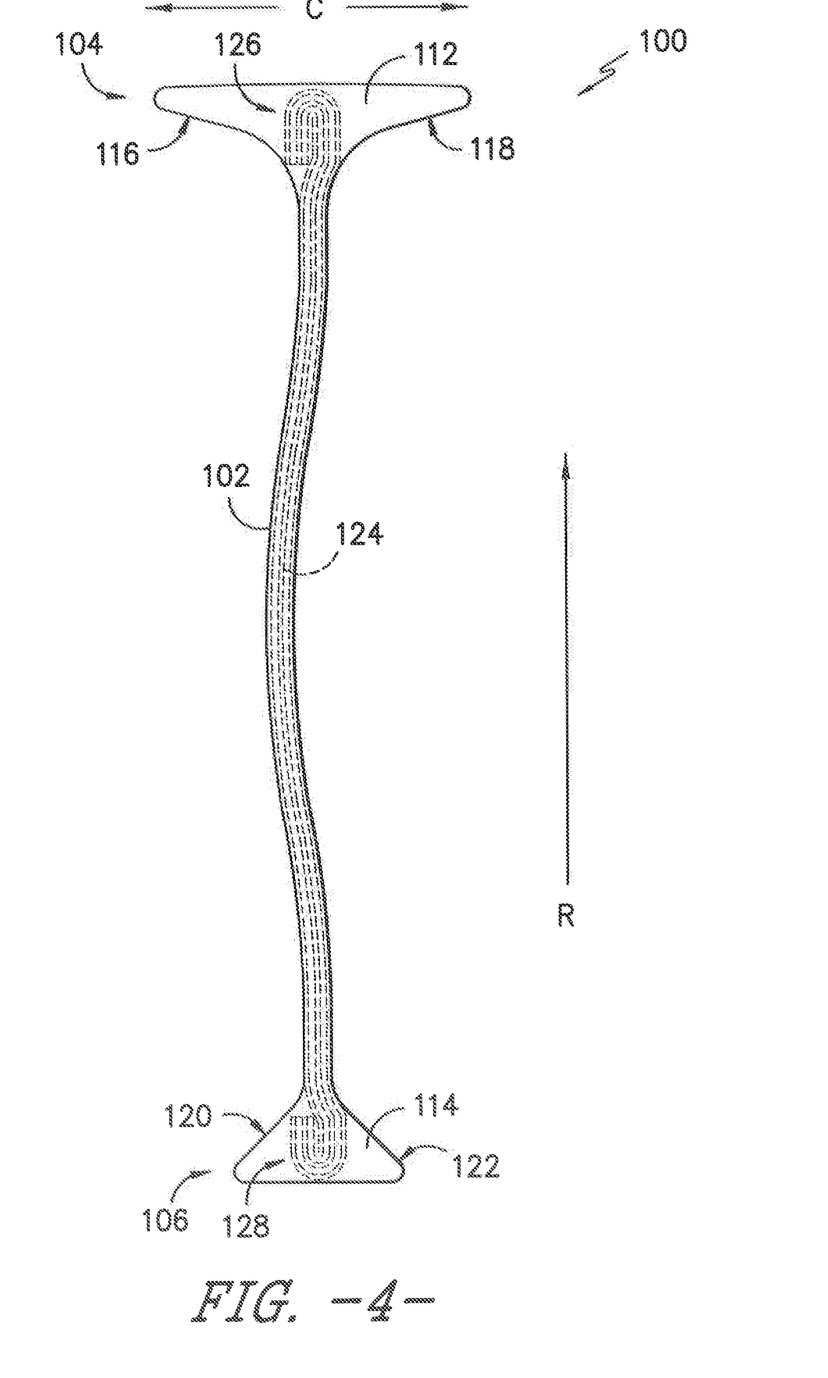
FIG. 4 is an end view of the exemplary web spoke of FIG. 3.

Referring now to FIGS. 2, 3, and 4, spoke 100 includes a web-like body 102 extending along the radial direction R. Arrow R points along a radial direction and from radially-inward to radially-outward when used in reference to the position and orientation of spoke 100 or its components within non-pneumatic wheel 50 (FIG. 1). Along radial direction R, web-like body 102 extends between a radially outer end 104 and a radially-inner end 106. Along axial direction A, web-like body 102 extends between opposing edges 108 and 110.

The radially outer end 104 of web-like body 102 forms an outer anchor 112 while the radially-inner end 106 forms inner anchor 114 (FIG. 4). For this exemplary embodiment, outer anchor 112 includes an outer pair of arms 116 and 118 that extend in an opposing manner or away from each other and body 102 along circumferential direction C. Similarly, inner anchor 114 includes an inner pair of arms 120 and 122 that extend in opposing manner or away from each other and body 102 along circumferential direction C. The present invention is not limited to the particular shape for web spoke 100 shown in the figures and other shapes and configurations may also be used. For example, while web spoke 100 has a familiar "1" shape as shown in FIG. 3 with triangular portions for anchors 112 and 114, other shapes can be used as well.

Anchors 112 and 114 provide versatility to the use of spoke 100 and its integration into wheel 50. For example, as shown in FIGS. 1 and 2, inner anchor 114 is removably installed within an axially-oriented slot or groove 66 of hub 52. During manufacture, inner anchor 114 can be readily slid along axial direction A or otherwise inserted into groove 56. Such construction also allows hub 52 to be readily substituted in the event of a desired change, repair, or otherwise.

For this exemplary embodiment, outer anchor 112 is attached to load support band 56. A variety of methods may be used to attach band 56 and outer anchor 112. For example, outer anchor 112 may be mechanically fastened or adhered to band 56. Alternatively, outer anchor 112 could be integrally formed with band 56. Other constructions may also be used.

Referring to FIG. 4, web-like body 102 includes a reinforcement structure 124. As shown, reinforcement structure 124 extends along radial direction R between radially-outer end 104 and radially-inner end 106. At radially-outer end 104, reinforcement structure 124 is provided with an outer fold 126. At radially-inner end 106, reinforcement structure 124 includes an inner fold 128. Folds 126 and 128 provide strength to spoke 100 while also helping secure the ends of reinforcement structure 124 in anchors 112 and 114. As such, folds 126 and 128 help reinforcement structure 124 ensure that the tensile forces experienced by web spoke 100 as it rotates away from the contact patch (the area of tread 58 in contact with the ground) and moves to the top of wheel 50 during use are transmitted between hub 52 and compliant band 56.

Figure 6:
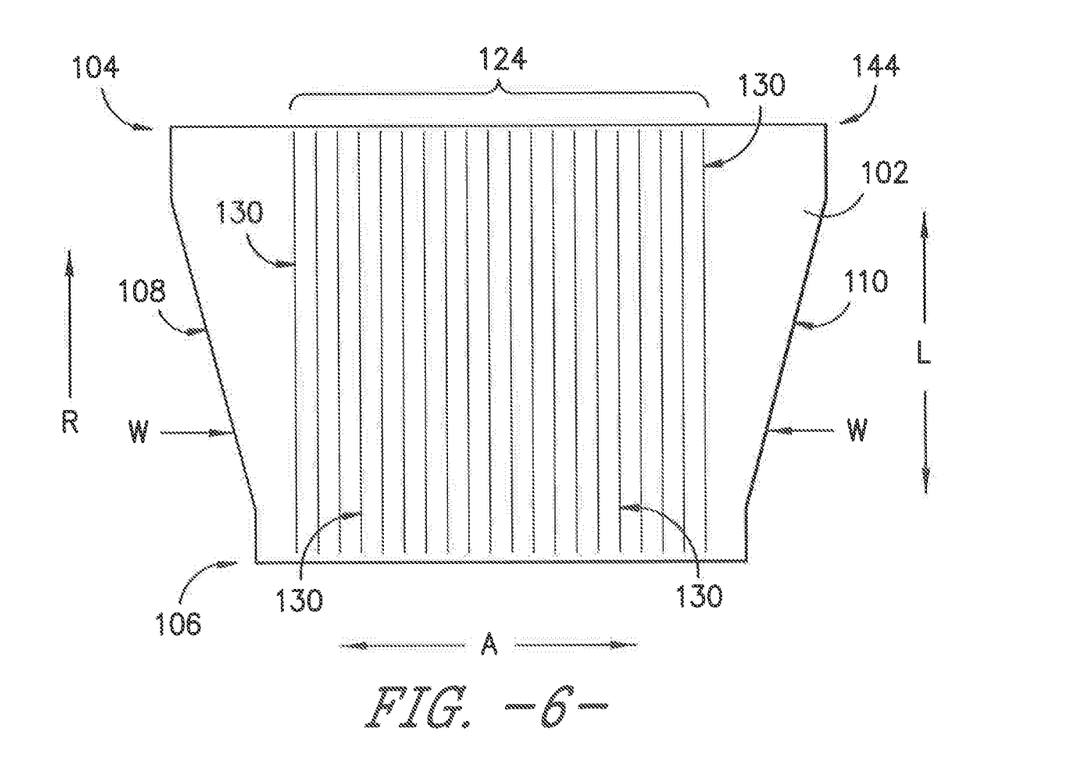
FIG. 6 provides a front view of an exemplary precursor used in making the exemplary spoke of FIG. 3.

A variety of shapes may be used for web-like body 102. For example, as shown in FIG. 6, web-like body 102 has a width W that increases along radial direction R moving from the radially-inner end 106 to radially-outer end 104. In other embodiments, width W may decrease, remain constant, or vary. Additionally, the thickness T of web-like body 102 along circumferential direction C may be uniform as shown in FIG. 3 or may vary along radial direction R.

Figure 5:
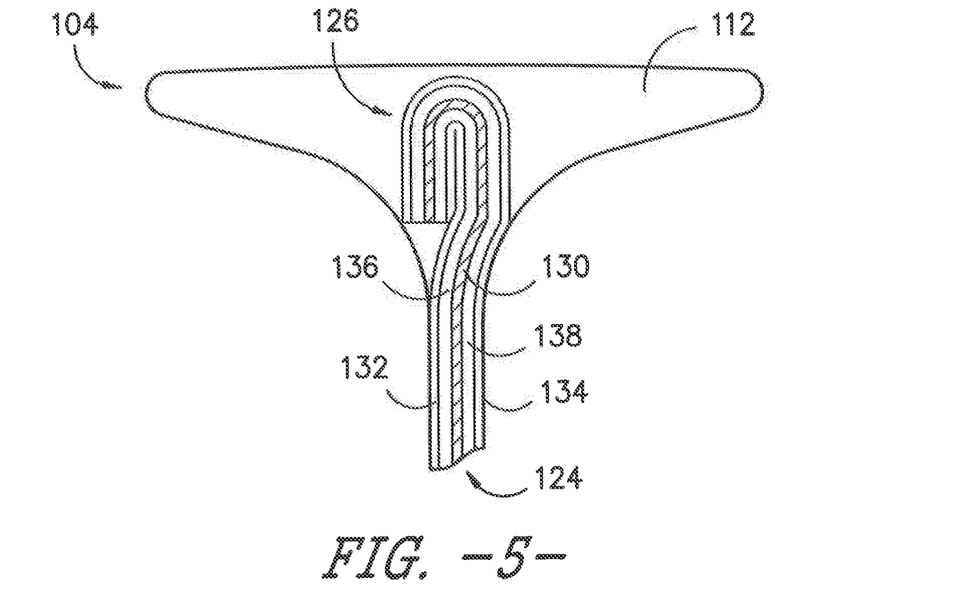
FIG. 5 provides a close-up, cross-sectional end view of the radially-outer end of an exemplary spoke of the present invention.

For this exemplary embodiment, as depicted in FIGS. 4, 5, and 6, reinforcement structure 124 includes a plurality of elongate, reinforcement elements 130. In one exemplary embodiment, reinforcement elements 130 are provided as inextensible cords 130 extending adjacent and parallel to each other along radial direction R. More particularly, for this embodiment, reinforcement elements 130 have a length that extends along radial direction R—i.e., reinforcement elements 130 extend longitudinally along radial direction R. Other orientations may be used.

For one exemplary embodiment, as used herein, "inextensible" means the material has an elongation at break of 12 percent or less as measured at 23° C. according to ASTM 885. By way of example, cords 130 may be constructed from nylon, steel, combinations thereof, and other materials as wed. Cords 130 may be positioned across the entire axial width W of web-like body 102 so that cords 130 are near edges 108 and 110 (FIGS. 7 and 8) or, alternatively, may be positioned across only a portion of width W such that cords 130 are spaced apart from edges 108 and 110 (FIG. 6).

Referring to FIGS. 4 and 5, reinforcement structure 124 can include a plurality of layers of polymeric material to form web-like body 102 as well. For example, in one exemplary embodiment, reinforcement structure 124 includes at least one pair of layers of polymeric material 136 and 138 with inextensible cords 130 embedded or sandwiched between layers 136 and 138. Layers 136 and 138 extend between the radially-outer end 104 and radially-inner end 106 and, therefore, have substantially the same length and shape as reinforcement structures 124.

For this exemplary embodiment, layers 136 and 138 form a first pair of layers immediately adjacent to cords 130 and a second pair of layers 132 and 134 are positioned outside of first pair of layers 136, 138. As with layers 136 and 138, layers 132 and 134 extend between the radially-outer end 104 and radially inner end 106 and, therefore, have substantially the same length and shape as reinforcement structures 124. Layers 132, 134, 136, and 138 are folded at radially-out ends 104 and 106 as shown in FIG. 4.

Various materials can be used for layers 132, 134, 136, and 138. In one exemplary embodiment of the invention, first pair of layers 136, 138 are constructed from a first polymeric material while second pair of layers 132, 134 are constructed from a second polymeric material. For example, the first polymeric material may have e.g., an elongation modulus MA10 (according to ASTM D412) measured at 10 percent elongation and at a temperature of 23° C. that is in the range of 1 to 10 MPa (megapascals). The second polymeric material may have e.g., an elongation modulus MA10 (according to ASTM D412) measured at 10 percent elongation and at a temperature of 23° C. that is in the range of 1 to 5 MPa. The first and second polymeric materials may be constructed of elastomeric materials that are tacky such that they will self-adhere or stick to themselves and/or each other during manufacture.

Various materials may be used for outer anchor 112 and inner anchor 114. For example, outer anchor 112 may be constructed from a polymeric material having e.g., an elongation modulus MA10 (according to ASTM D412) measured at 10 percent elongation and at a temperature of 23° C. that is in the range of 10 to 30 MPa (megapascals). Inner anchor 114 may be constructed from a polymeric material having e.g., an elongation modulus MA10 (according to ASTM D412) measured at 10 percent elongation and at a temperature of 23° C. that is in the range of 20 to 60 MPa (megapascals).

Figure 13:
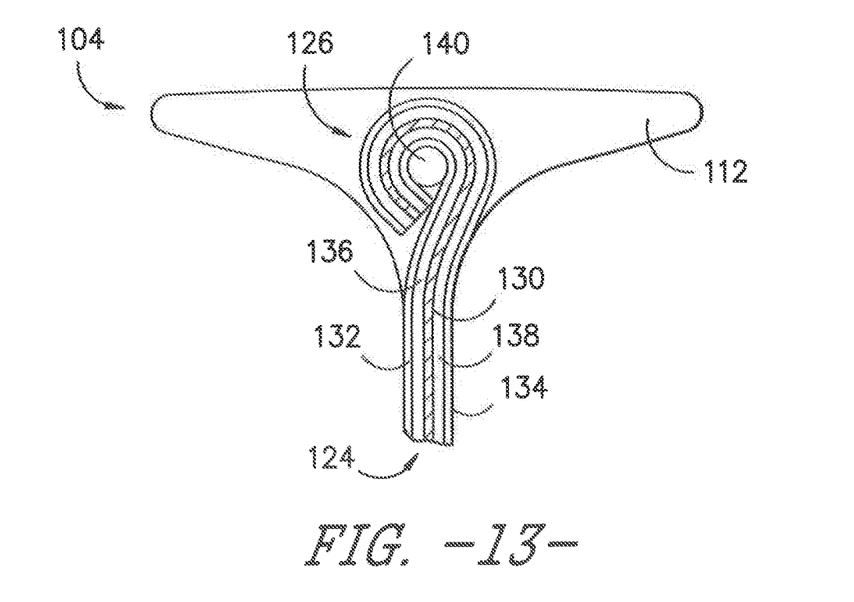
FIG. 13 is a close-up, cross-sectional end view of the radially-outer end of another exemplary spoke.

FIG. 13 provides another exemplary embodiment for web spoke 100. As shown, the embodiment of FIG. 13 is similar to the embodiment of FIG. 5 except that an elongated rod 140 is contained within outer fold 126 of reinforcement structure 124. The length of rod 140 extends along axial direction A between edges 108 and 110. A similar construction may be used to place a rod in inner fold 128 of reinforcement structure 124. Such rods can be constructed from e.g., metal, fiberglass-reinforced composites, or combinations thereof. Rods within folds 126 and 128 provide additional support for securing folds 126 and 128 in anchors 112 and 114.

An exemplary method of manufacturing a spoke, such as e.g., spoke 100, for a non-pneumatic will now be set forth. Using the teachings disclosed herein, one of skill in the art will understand that the exemplary method may be used with other exemplary aspects of the invention as well to provide additional exemplary methods. As used herein, the term "method" or "process" refers to one or more steps that may be performed in other ordering than shown without departing from the scope of the presently disclosed invention. Any sequence of steps is exemplary and is not intended to limit methods described herein to any particular sequence, nor is it intended to preclude adding steps, omitting steps, repeating steps, or performing steps simultaneously. As used herein, the term "method" or "process" may include one or more steps performed at least by one electronic or computer-based apparatus having a processor for executing instructions that carry out the steps.

Figure 7:
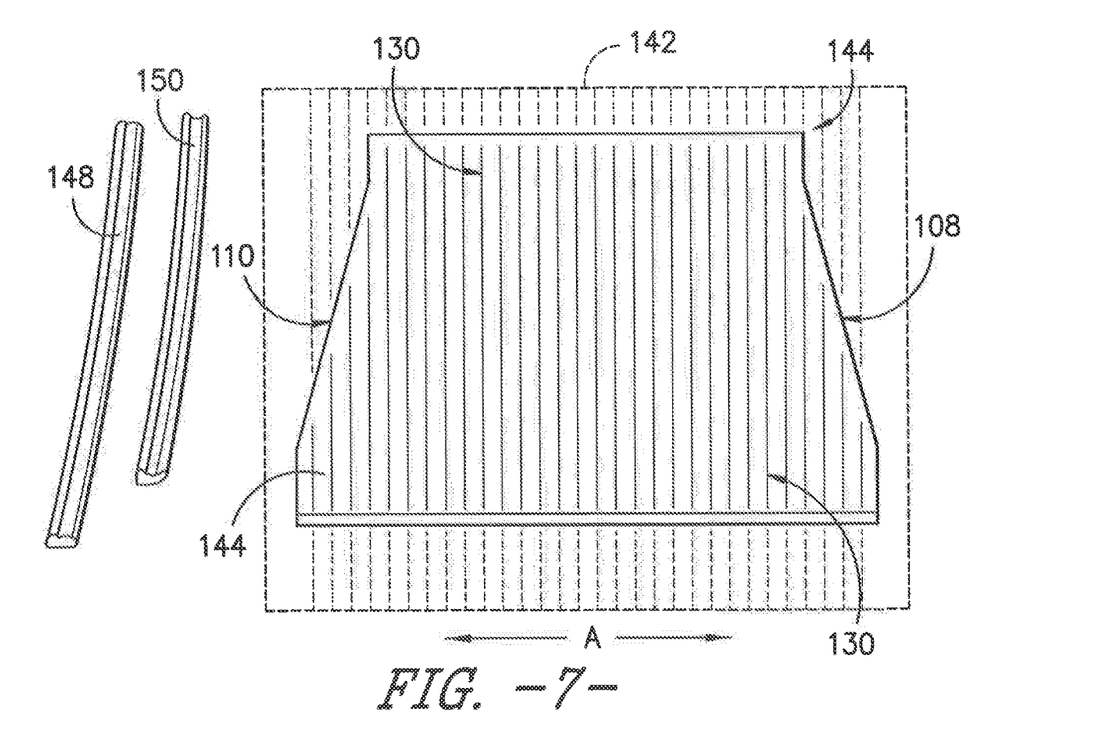
FIG. 7. is a perspective view of exemplary intermediates used in making the exemplary spoke of FIG. 3.

In one exemplary aspect, the present invention provides an exemplary method of manufacturing a spoke—such as web spoke 100—for a non-pneumatic wheel. Referring to FIG. 7, one or more sheets 142 of polymeric material are provided from which a precursor 144 (FIG. 8) of the web-like body 102 is formed by cutting sheets 142 in the shape desired. For example, sheet 142 may include sheets stacked or sandwiched together to provide layers 132, 134, 136, and 138 as described with regard to FIG. 5—with elongate reinforcement elements 130 positioned between layers 136 and 138. Sheet 142 may be arranged such that the reinforcement elements 130 are positioned along radial direction R.

FIG. 7 also depicts outer anchor strips 148 and 150 that will be joined with precursor 144 as described later. In one exemplary aspect, the layers forming sheet 142 and used to form precursor 144 include one or more uncured, rubber materials. For example, the first and second polymeric materials used in layers 132, 134, 136, and 138 may initially include uncured rubber where these layers are not cross-linked to one another.

Figure 8:
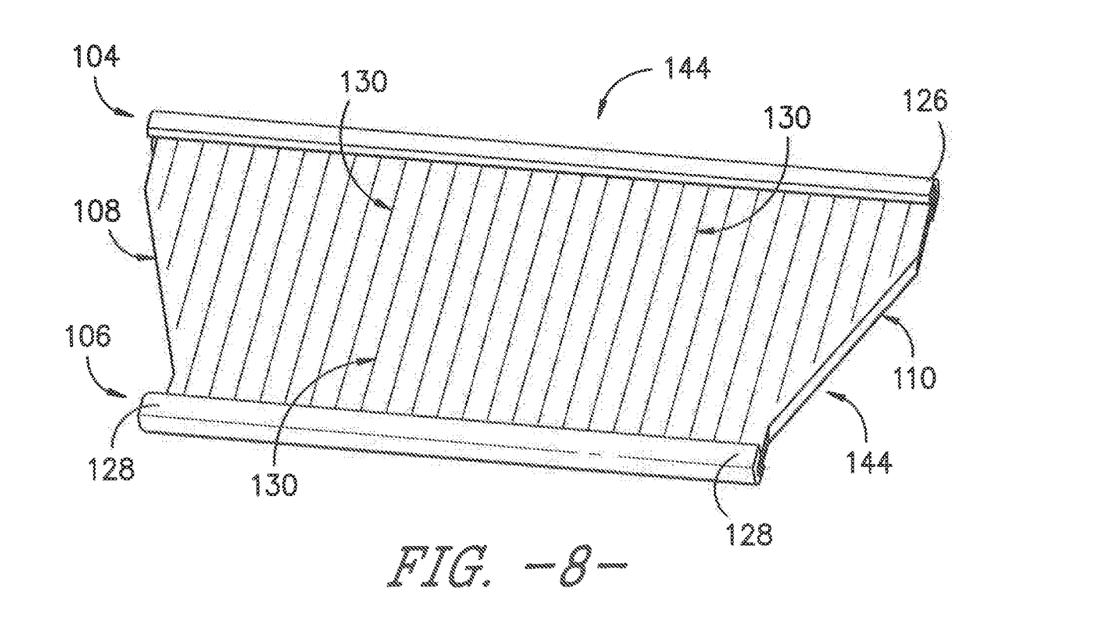
FIG. 8 illustrates aspects of an exemplary method used in making the exemplary spoke of FIG. 3.

As shown in FIG. 8, after cutting precursor 144 from sheet 142, a radially-outer end 104 is folded to form outer fold 126 in precursor 144. Similarly, a radially-inner end 106 is folded to form inner fold 128 in precursor 144. The references to radially-outer and radially-inner are with regard to the position such features will occupy within non-pneumatic wheel 50. In one exemplary embodiment, the materials used to form the outer layers 132 and 134 of precursor 144 are tacky or self-adhering. As such, folds 126 and 128 can be readily created by folding and pressing ends 104 and 106 back against precursor 144. A tool having e.g., an edge or flat surface can be used to help press precursor 144 and create folds 126 and 128.

Figure 9:
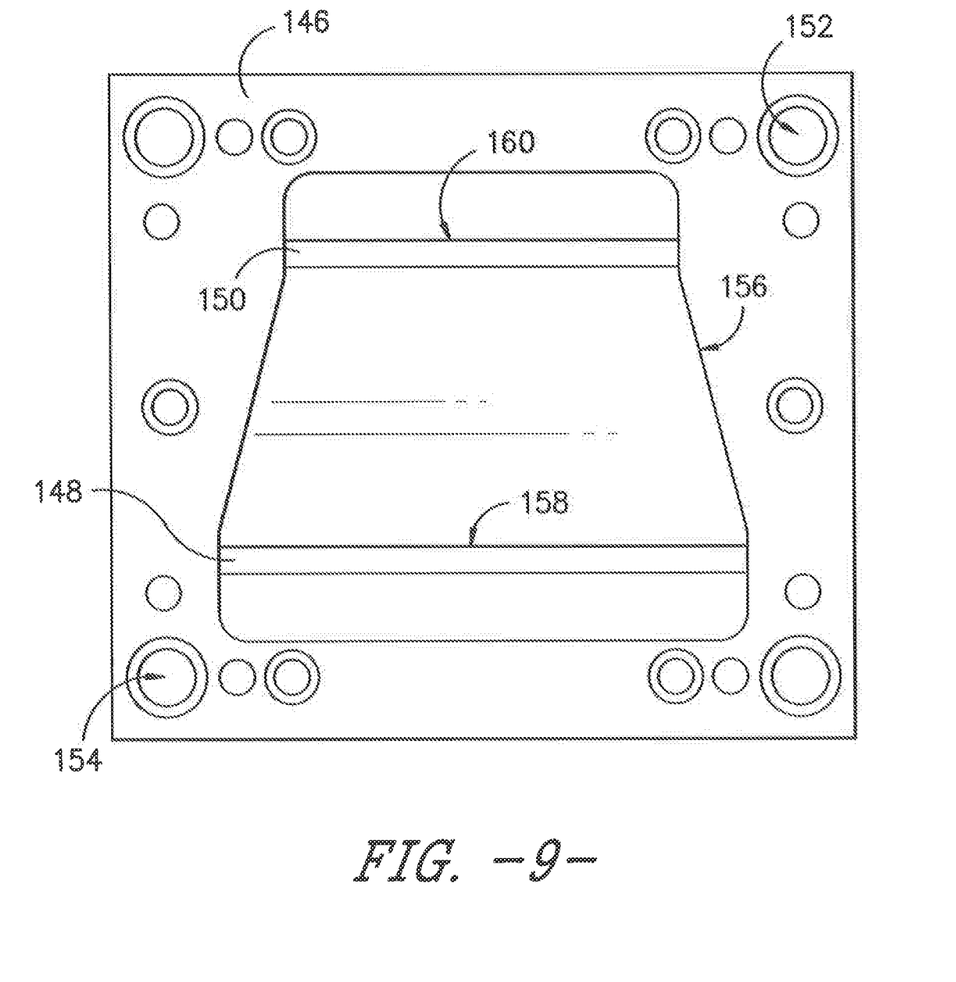
FIGS. 9, 10, and 11 illustrate additional aspects of an exemplary method of the present invention while also depicting a top view of a mold portion (FIG. 9), a perspective end view of the mold portion (FIG. 10), and a perspective end view of another mold portion (FIG. 11).

FIG. 9 provides a top view of a first mold portion 146 defining a recess 156. Recess 156 includes an axially-oriented groove 158 into which outer anchor strip 148 is placed. Recess 156 also includes an axially-oriented groove 160 (shown here as parallel to groove 158) into which an inner anchor strip 150 is placed. A tool having an edge or other flat surface can be used to press strips 148 and 150 into their respective grooves 158 and 160, respectively. Strips 148 and 150 form a portion of outer anchor 112 and inner anchor 114, respectively.

Figure 10:
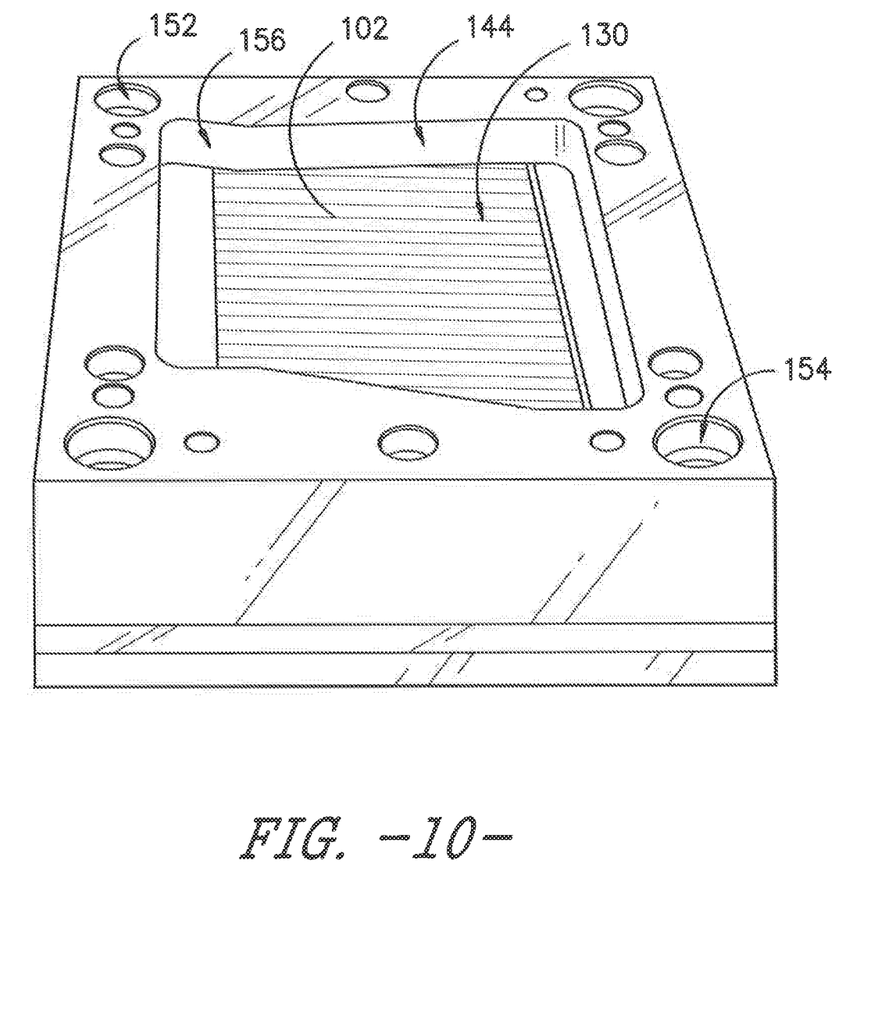

Referring to FIG. 10, after positioning anchor strips 148 and 150, precursor 144 (which will form web-like body 102) is placed into recess 156 of first mold portion 146. Precursor 144 is carefully pressed into contact with strips 148 and 150 and against the molding surfaces of first mold portion 146. A tool having e.g., an edge or flat surface can be used to help press precursor 144 against strips 148 and 150. As shown, precursor 144 has an overall shape that matches with the shape of recess 156.

Figure 11:
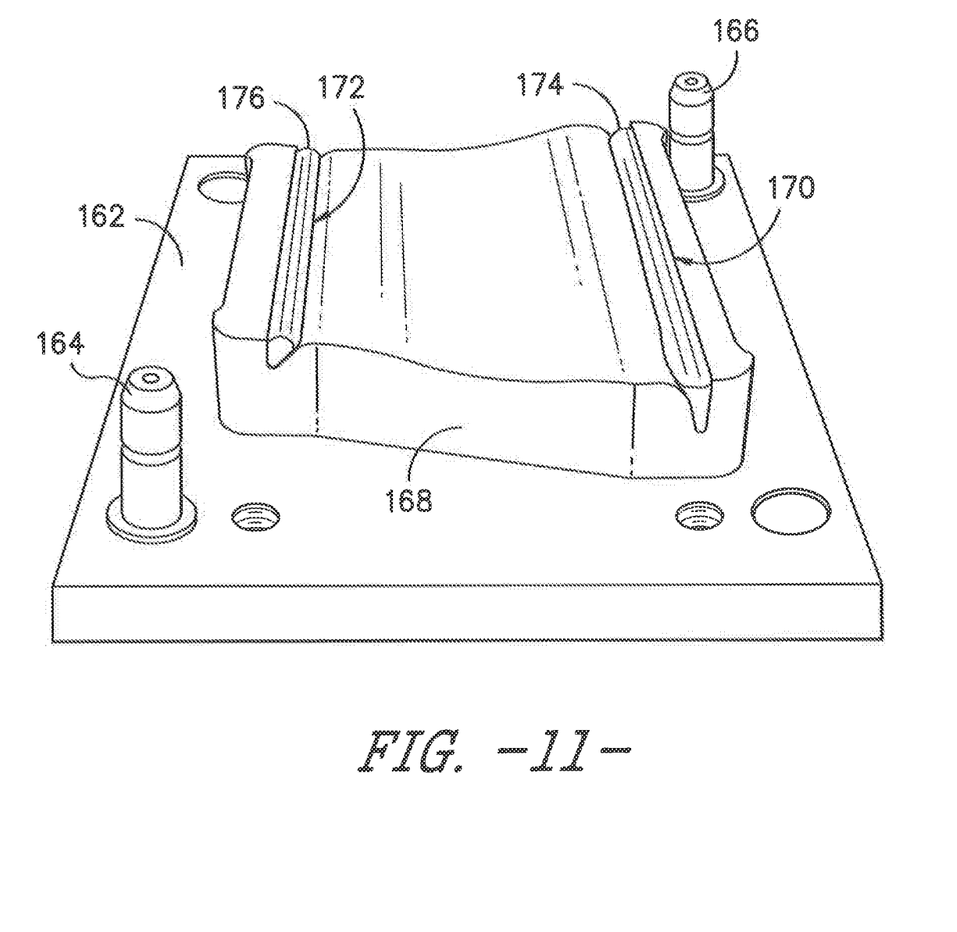

As illustrated in FIG. 11, a second mold portion 162 is provided with a relief or projection 168 that mates in complementary fashion with recess 156 in first mold portion 146. Second mold portion 162 also includes posts 164 and 166 that are inserted into openings 152 and 154 of first mold portion 146 when portions 146 and 162 are combined and pressed. Projection 168 defines a pair of parallel grooves 170 and 172.

Another outer anchor strip 174 is placed into axially-oriented groove 170 and another inner anchor strip 176 is placed into axially-oriented groove 172. A flat edge or other tool can be used to tightly press strips 174 and 176 into grooves 170 and 172. Strips 174 and 176 form a portion of anchors 112 and 114, respectively.

Figure 12:
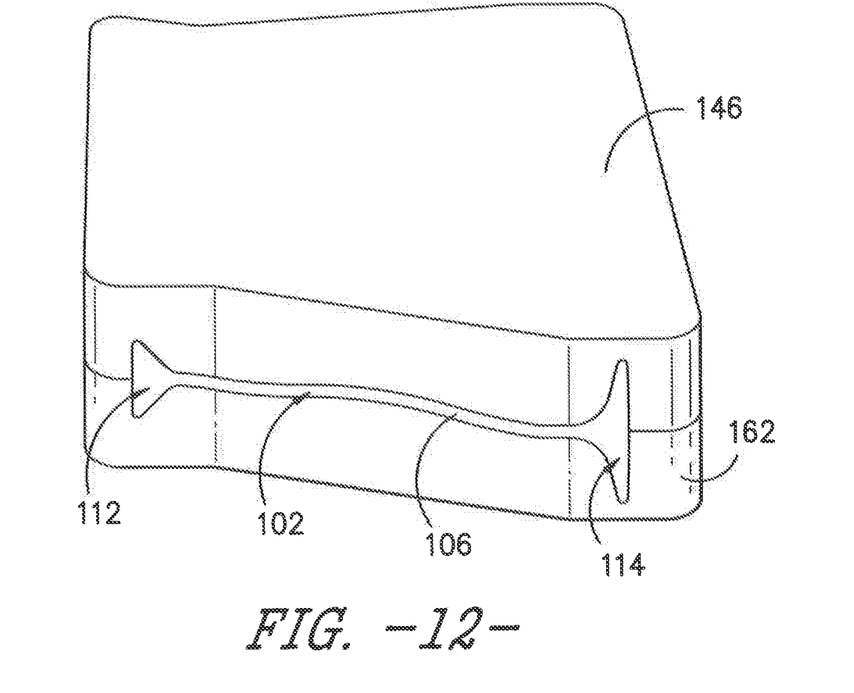
FIG. 12 is a perspective end view illustrating the mold portions joined together with an exemplary web spoke molded therebetween.

As shown in FIG. 12, first mold portion 146 and second mold portion 164 are joined together so as to combine precursor 144 and all anchor strips 148, 150, 174, and 176, Heat is applied to mold portion 146 and 164 so as heat precursor 144 and all anchor strips 148, 150, 174, and 176. Pressure may also be applied to squeeze mold portions 146 and 164 together during such heating and thereby press the materials contained therein. In one exemplary embodiment, the application of heat and pressure is maintained until the precursor 144 and all anchor strips 148, 150, 174, and 176 are joined and cross-linked together to form an integral web spoke 100. For example, in one exemplary embodiment, heat is maintained until a temperature of 150° C. to 180° C. is achieved for at least a period of 10 to 20 minutes. After allowing sufficient time for curing, web spoke 100 can be removed from mold portions 146 and 164.

The present invention is not limited to the particular shapes or configurations of mold portions 146 and 164. Others may be used to provide e.g., different shapes and configurations for web spoke 100.

In an alternative, exemplary aspect of the present invention, web spoke 100 or embodiments thereof may be manufactured from e.g., polyurethane or silicone elastomers. Various molding processes may be used to manufacture web spoke 100 from such materials including e.g., injection molding, compression molding, or casting. For example, in an injection molding process, reinforcements 130 would be placed in a mold in the shape of web spoke 100. The mold would then be injected with e.g., polyurethane or silicone elastomers. After the materials are allowed to cure, the web spoke 100 would be removed from the mold.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method of manufacturing a spoke for a non-pneumatic wheel defining radial, axial, and circumferential directions, the spoke having a web-like body extending between an outer anchor at a radially-outer end of the spoke and an inner anchor at a radially-inner end of the spoke, the method comprising:
cutting a sheet to form a precursor, the precursor having an overall shape desired for the spoke and having a radially-outer end and a radially-inner end, the sheet comprising
a polymeric material;
a plurality of elongate, reinforcement elements ending parallel to each other;
folding the radially-outer end back against the precursor to form an outer fold and folding the radially-inner end back against the precursor to form an inner fold;
placing an outer anchor strip into a groove of a first mold portion at a location for forming the radially-outer end of the spoke;
placing an inner anchor strip into another groove of the first mold portion at a location for forming the radially-inner end of the spoke;
inserting the precursor into the first mold portion in contact with the inner anchor strip and the outer anchor strip;
placing another outer anchor strip into a recess of a second mold portion at a location for forming the radially-outer end of the spoke;
placing another inner anchor strip into another recess of the second mold portion at a location for forming the radially-inner end of the spoke;
joining the first mold portion and the second mold portion so as to combine the precursor and anchor strips together;
heating the precursor and anchor strips so as to join and cross-link the precursor and anchor strips and form the spoke; and
pressing the outer fold and the inner fold to as to self-adhere the polymeric material of the precursor before inserting the precursor into the first mold portion.

2. The method of manufacturing a spoke for a non-pneumatic wheel as in claim 1, further comprising pressing the anchor strip portions into the first and second mold portions after placing the anchor strip portions into the first and second mold portions.

3. The method of manufacturing a spoke for a non-pneumatic wheel as in claim 1, further comprising applying pressure to the precursor and anchor strips during the heating.

4. The method of manufacturing a spoke for a non-pneumatic wheel as in claim 1, wherein the outer anchor and the inner anchor are formed from the anchor strips.

5. The method of manufacturing a spoke for a non-pneumatic wheel as in claim 1, wherein the sheet of polymeric material comprises a plurality of layers of rubber materials.

6. The method of manufacturing a spoke for a non-pneumatic wheel as in claim 1, further comprising orienting the sheet so that the plurality of elongate, reinforcement elements extend longitudinally between the radially-outer end and the radially-inner end of the precursor.

7. The method of manufacturing a spoke for a non-pneumatic wheel as in claim 1, wherein the reinforcement elements comprise inextensible cords extending between the radially-outer end and the radially-inner end of the precursor.

8. The method of manufacturing a spoke for a non-pneumatic wheel as in claim 1, wherein the sheet comprises
a first pair of layers comprising a first polymeric material, wherein the first pair of layers extend between the radially-outer end and the radially-inner end with the reinforcement elements embedded between the first pair of layers; and
a second pair of layers comprising a second polymeric material, wherein the second pair of layers extend between the radially-outer end and the radially-inner end with the first pair of layers positioned between the second pair of layers.

9. The method of manufacturing a spoke for a non-pneumatic wheel as in claim 8, wherein the First polymeric material has an elongation modulus MA10 measured at 10 percent elongation and at a temperature of 23° C. that is in the range of 1 to 10 MPa.

10. The method of manufacturing a spoke for a non-pneumatic wheel as in claim 9, wherein the second polymeric material has an elongation modulus MA10 measured at 10 percent elongation and at a temperature of 23° C. that is in the range of 1 to 5 MPa.

11. The method of manufacturing a spoke for a non-pneumatic wheel as in claim 1, further comprising:
placing an outer elongate rod within the outer fold;
placing an inner elongate rod within the inner fold;
wherein the inner elongate rod and the outer elongate rod each extend along the axial direction between the opposing edges of the web-like body.

12. The method of manufacturing a spoke for a non-pneumatic wheel as in claim 11, wherein the inner elongate rod and the outer elongate rod each comprise a fiberglass material.

13. The method of manufacturing a spoke for a non-pneumatic wheel as in claim 1, wherein the outer anchor comprises a polymeric material having an elongation modulus MA10 measured at 10 percent elongation and at a temperature of 23° C. that is in the range of 10 to 30 MPa.

14. The method of manufacturing a spoke for a non-pneumatic wheel as in claim 13, wherein the inner anchor comprises a polymeric material having an elongation modulus MA10 measured at 10 percent elongation and at a temperature of 23° C. that is in the range of 20 to 60 MPa.

* * * * *